(12) United States Patent
Thomas et al.

(10) Patent No.: US 8,264,406 B2
(45) Date of Patent: Sep. 11, 2012

(54) MANIFOLD CALIBRATION FOR A COMMUNICATION SYSTEM

(75) Inventors: Timothy A. Thomas, Palatine, IL (US); Frederick W. Vook, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 160 days.

(21) Appl. No.: 12/759,872

(22) Filed: Apr. 14, 2010

(65) Prior Publication Data
US 2011/0254736 A1    Oct. 20, 2011

(51) Int. Cl.
*H04B 7/00* (2006.01)
*G01S 5/02* (2010.01)
*H01Q 3/00* (2006.01)

(52) U.S. Cl. ........ 342/367; 342/368; 342/417; 342/422; 342/423

(58) Field of Classification Search .................. 342/367, 342/377, 417, 422, 423, 368
See application file for complete search history.

(56) References Cited

U.S. PATENT DOCUMENTS

| | | | |
|---|---|---|---|
| 5,546,090 A | 8/1996 | Roy et al. | |
| 6,232,918 B1 | 5/2001 | Wax et al. | |
| 7,199,753 B2 * | 4/2007 | Pauplis | 342/368 |
| 7,218,273 B1 * | 5/2007 | Webster et al. | 342/174 |
| 7,304,605 B2 * | 12/2007 | Wells | 342/357.62 |
| 2008/0079763 A1 | 4/2008 | Abrott | |
| 2009/0323783 A1 | 12/2009 | Buris et al. | |
| 2010/0117890 A1 | 5/2010 | Vook et al. | |

FOREIGN PATENT DOCUMENTS

WO    0117065 A1    3/2001

OTHER PUBLICATIONS

Patent Cooperation Treaty, International Search Report and Written Opinion of the International Searching Authority for International Application No. PCT/US2011/032011, Oct. 18, 2011, 15 pages.

Tao Su, et al., "Simulation of Mutual Coupling Effect in Circular Arrays for Direction-Finding Application," Microwave and Optical Tech. Letters, vol. 26, No. 5, Sep. 5, 2000.

* cited by examiner

*Primary Examiner* — Jack W Keith
*Assistant Examiner* — Cassie Galt (57) ABSTRACT

A method and apparatus for determining stream weights is provided herein. During operation, an uplink direction of arrival (DOA) and a downlink direction of departure (DOD) calibration procedure is implemented using uplink signals and GPS information from a subset of mobiles without the need of calibration circuitry at the base. Because the presented calibration procedure needs no new hardware it can be deployed in existing deployments with only a soft-ware upgrade.

12 Claims, 6 Drawing Sheets

MANIFOLD CALIBRATION FOR A COMMUNICATION SYSTEM

FIELD OF THE INVENTION

The present invention relates generally to communication systems and in particular, to a method and apparatus for performing manifold calibration within a communication system.

BACKGROUND OF THE INVENTION

Transmit beamforming (sometimes referred to as transmit adaptive array (TXAA) transmission) increases the effective signal-to-noise ratio seen by a receiver device by creating a coverage pattern that tends to be directional in nature (i.e., not uniformly broadcast). Transmit beamforming is accomplished by employing multiple antennas at the transmit site and weighting each antenna such that the combined transmissions result in a beamformed pattern that delivers maximum power/energy to the receiver.

In the implementation of the transmit and receive radio frequency (RF) hardware, an unknown gain and phase is present on each transmit and receive branches due to such hardware mismatches such as cable length differences and filter response differences. These unknown gain and phase values, which may be frequency selective, make direction of arrival (DOA) or direction of departure (DOD) estimation difficult (if not impossible) because they cause the baseband array response vector for a given DOA or DOD to be different from what would be predicted from the array geometry (i.e., the position and orientation of the antennas comprising the antenna array).

Fortunately these gain and phase values change slowly in time (typically on the order of hours), so they can be estimated and their effects removed from the received or transmitted signals during manifold calibration. For DOD beamforming, manifold calibration means that for each DOD of interest, the corresponding transmit array response vector at baseband corresponds (to within a scalar constant) to the array response vector that would be predicted from the array geometry. If the array is manifold calibrated, then a DOA estimated on the uplink can easily be translated to a DOD on the downlink (i.e., a beam can be pointed in the mobile direction using an uplink DOA estimate). For DOA estimation on the uplink, manifold calibration means that the baseband response of a signal received from a certain direction on the uplink matches the array response vector predicted from the array geometry (or equivalently that the baseband vector channel response is spatially equivalent to the RF vector channel response).

Figure 1:
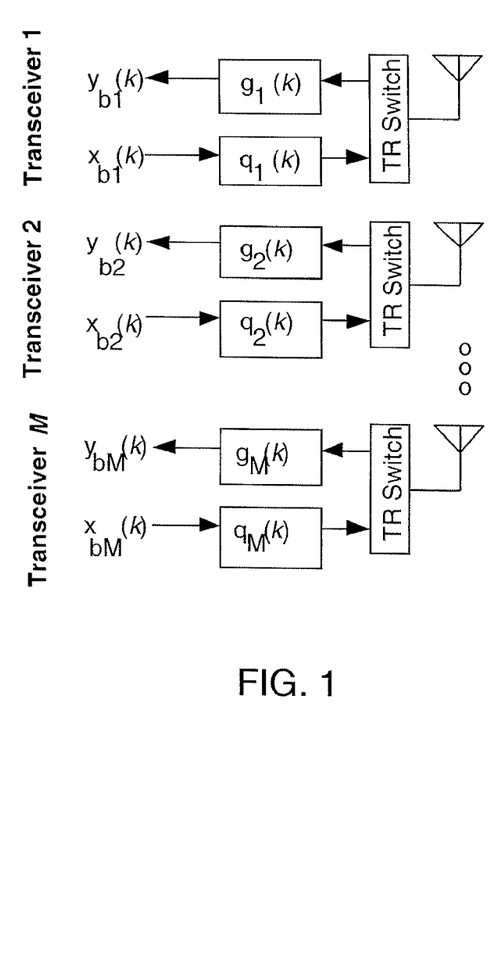
FIG. 1 illustrates gain and phase values introduced by system hardware.

FIG. 1 illustrates gain and phase values introduced by system hardware. First, the response of the base station transmit hardware from baseband to RF is captured by the M×1 vector q(k) where M is the number of antennas (transmit and receive) at the base station and k is the subcarrier (or frequency) index. Similarly, the response of the base station receiver hardware from RF to baseband is captured by the M×1 vector g(k). In the figure, $g_1(k)$ refers to element one of g(k), $g_2(k)$ refers to element 2 of g(k), and so on (and a similar definition is true for q(k)).

In an OFDM communication system, the M×1 noiseless signal received at the base station array of M antennas from a mobile with a single antenna may be modeled at baseband in the frequency domain as $$M \times 1 \ Y(k, b) = x(k, b) \sum_{l=1}^{P} \gamma_l(b) G(k) a(\theta_l) e^{-j2\pi k \tau_l \Delta_F} \quad (1)$$

where k is the subcarrier index, b is the time (OFDM symbol) index, x(k,b) is the transmitted symbol, P is the number of multipath components (rays), $\gamma_l(b)$ is the complex gain of the $l^{th}$ multipath component, $G(k)=\text{diag}(g_1(k), \ldots, g_M(k))$ where $g_m(k)$ is the receive hardware induced gain and phase for receive antenna m, $\tau_l$ is the time of arrival (TOA) for path l, $\Delta_F$ is the subcarrier separation (in Hz), $\theta_l$ is the DOA of the $l^{th}$ path, and $a(\theta)$ is the array manifold vector which for a uniform linear array with inter-element spacing of d (in wavelengths) is given as $$M \times 1 \ a(\theta) = \begin{bmatrix} 1 \\ e^{-j2\pi d \sin(\theta)} \\ \vdots \\ e^{-j2\pi d(M-1)\sin(\theta)} \end{bmatrix}. \quad (2)$$

Figure 2:
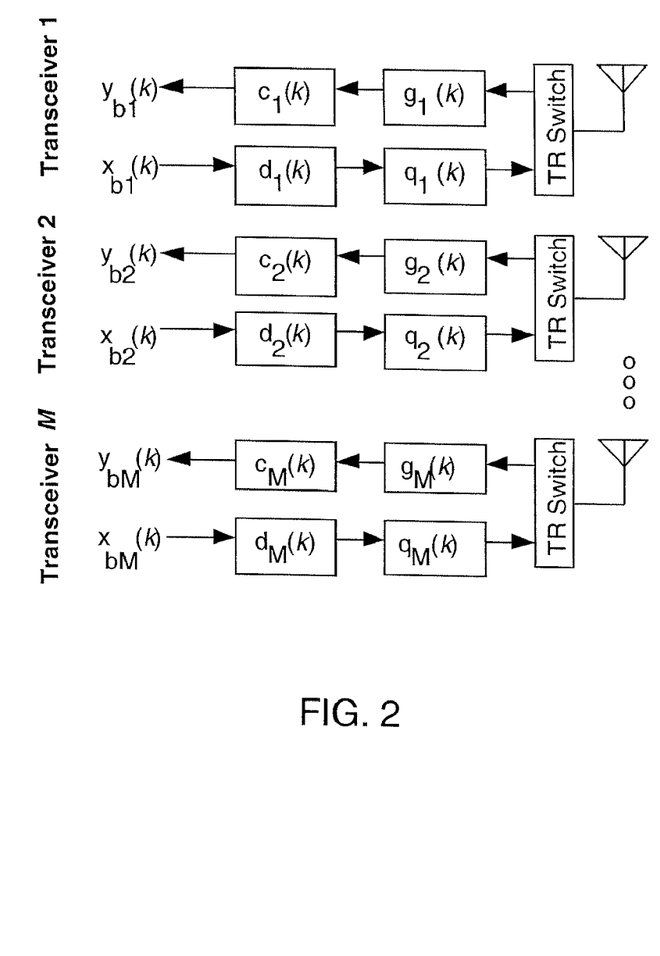
FIG. 2 illustrates DOA and DOD calibration coefficients being applied to received and transmitted signals in order to reduce the gain and phase values introduced by system hardware.

The goal of DOA calibration is to find a matrix $C(k)=\text{diag}(c_1(k), \ldots, c_M(k))$, which contains the DOA calibration coefficients, that when it is applied to Y(k,b), removes the effects of G(k). Mathematically the application of C(k) can be expressed as:

$$\tilde{Y}(k, b) = C(k)Y(k, b) = x(k, b) \sum_{l=1}^{P} \gamma_l(b) a(\theta_l) e^{-j2\pi k \tau_l \Delta_F} \quad (3)$$

which now has the unknown receiver gains and phases removed and thus a ray from angle $\theta_l$ will appear to mathematically match the array response vector in Error! Reference source not found. This type of DOA calibration is shown in FIG. 2 where additional blocks are included on the input to each receive branch ($c_i(k)$). These blocks represent the calibration coefficients that are applied to eliminate the effects of G(k).

On the transmit side, the transmitted signal from the M-element base array received at a single mobile antenna may be modeled as:

$$z(k, b) = v^T(k, b) \sum_{l=1}^{P} \gamma_l(b) Q(k) a(\theta_l) e^{-j2\pi k \tau_l \Delta_F} \quad (4)$$

where v(k,b) is a M×1 vector containing the frequency-domain signals transmitted from each transmit antenna and $Q(k)=\text{diag}(q_1(k), \ldots, q_M(k))$ where $q_m(k)$ is the transmit hardware induced gain and phase for transmit antenna m. Note that some of the downlink channel parameters will be the same as the uplink channel in Error! Reference source not found. such as the angles (the DODs equal the DOAs) and the TOAs regardless of whether the system is time division duplexed (TDD) or frequency division duplexed (FDD). However, for FDD systems, the channel gains and antenna spacing in wavelengths will be different on the uplink and downlink, whereas for TDD systems the channel gains are likely the same on the uplink and downlink. The transmitted frequency-domain signal from each antenna, v(k,b), can be pilot sequences which enable mobiles to compute the downlink channel. This measured downlink channel can then be turned into feedback (e.g., codebook feedback) which the mobile will send to the base station. This feedback can be used by the base to beamform the downlink. Another example of v(k,b) is DOD beamforming with v(k,b)=wx(k,b) where x(k,b) is a data stream and w is an M×1 vector corresponding to the DOD beamformer as is known in the art.

The goal of DOD calibration is to estimate a matrix $D(k)= \mathrm{diag}(d_1(k), \ldots, d_M(k))$, which contains the DOD calibration coefficients, that when applied to the transmitted signal will remove the effects of $Q(k)$. The DOD calibration is illustrated in FIG. 2 where the output from each transmit branch has DOD calibration coefficient ($d_m(k)$ for antenna branch m) applied. Mathematically the DOD calibrated signal is given as $$\tilde{z}(k,b) = v^T(k,b) \sum_{l=1}^{P} \gamma_l(b) Q(k) a(\theta_l) e^{-j2\pi k \tau_l \Delta_F} \quad (5)$$
$$= v^T(k,b) \sum_{l=1}^{P} \gamma_l(b) a(\theta_l) e^{-j2\pi k \tau_l \Delta_F}$$

which has the effects of the transmit hardware removed.

As mentioned above $v(k,b)$ could be traditional DOD beamforming based on an estimate of the DOA on the uplink.

The existing manifold calibration methods either require special hardware at the base station like calibration hardware or a sensing antenna or require hardware outside of the base station like a special transceiver with a fixed location to perform calibration. Hence a need exists for a method and apparatus for determining the appropriate calibration coefficients in software without the need of special calibration equipment at the base or by needing a dedicated fixed transceiver for calibration.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to address the above-mentioned need, a method and apparatus for determining calibration coefficients is provided herein. During operation, an uplink direction of arrival (DOA) and a downlink direction of departure (DOD) calibration procedure are implemented using uplink signals and GPS information from a subset of mobiles without the need of calibration circuitry at the base. Because the presented calibration procedure needs no new hardware it can be deployed in existing deployments with only a software upgrade.

The present invention encompasses a method for performing direction of arrival (DOA) manifold calibration. The method comprising the steps of determining by a base station, an angle $\theta$ to a mobile unit, receiving by the base station, an uplink transmission ($Y(k,b)$) from the mobile unit, and determining, by the base station, a dominant vector $r(b)$ from the received uplink transmission. The base station then computes calibration coefficients $C(b)$ based on the angle $\theta$ and $r(b)$ and applies the calibration coefficients to received uplink transmissions.

The present invention additionally encompasses a method for performing direction of departure (DOD) manifold calibration. The method comprises the steps of determining by a base station, an angle $\theta$ to a mobile unit, receiving feedback from the mobile unit regarding a dominant downlink vector $r(b)$, and determining, calibration coefficients D based on the angle $\theta$ and dominant downlink vector $r(b)$. the calibration coefficients are then applied to downlink transmissions to the mobile unit.

The present invention additionally encompasses an apparatus for performing direction of arrival (DOA) manifold calibration. The apparatus comprises calibration circuitry having as an input, information on an angle $\theta$ to a mobile unit, an uplink transmission ($Y(k,b)$) from a mobile unit, the calibration circuitry determining a dominant vector $r(b)$ from the received uplink transmission, the calibration circuitry outputting calibration coefficients $C(b)$ based on the angle $\theta$ and $r(b)$. The apparatus additionally comprises multiplication circuitry applying the calibration coefficients to received uplink transmissions.

The present invention additionally encompasses an apparatus for performing direction of departure (DOD) manifold calibration. The apparatus comprises calibration circuitry receiving information on an angle $\theta$ to a mobile unit and receiving vector feedback from the mobile unit regarding a dominant downlink vector $r(b)$, the calibration circuitry outputting calibration coefficients D based on the angle $\theta$ and dominant downlink vector $r(b)$. The apparatus additionally comprises multiplication circuitry applying the calibration coefficients to downlink transmissions to the mobile unit.

Figure 3:
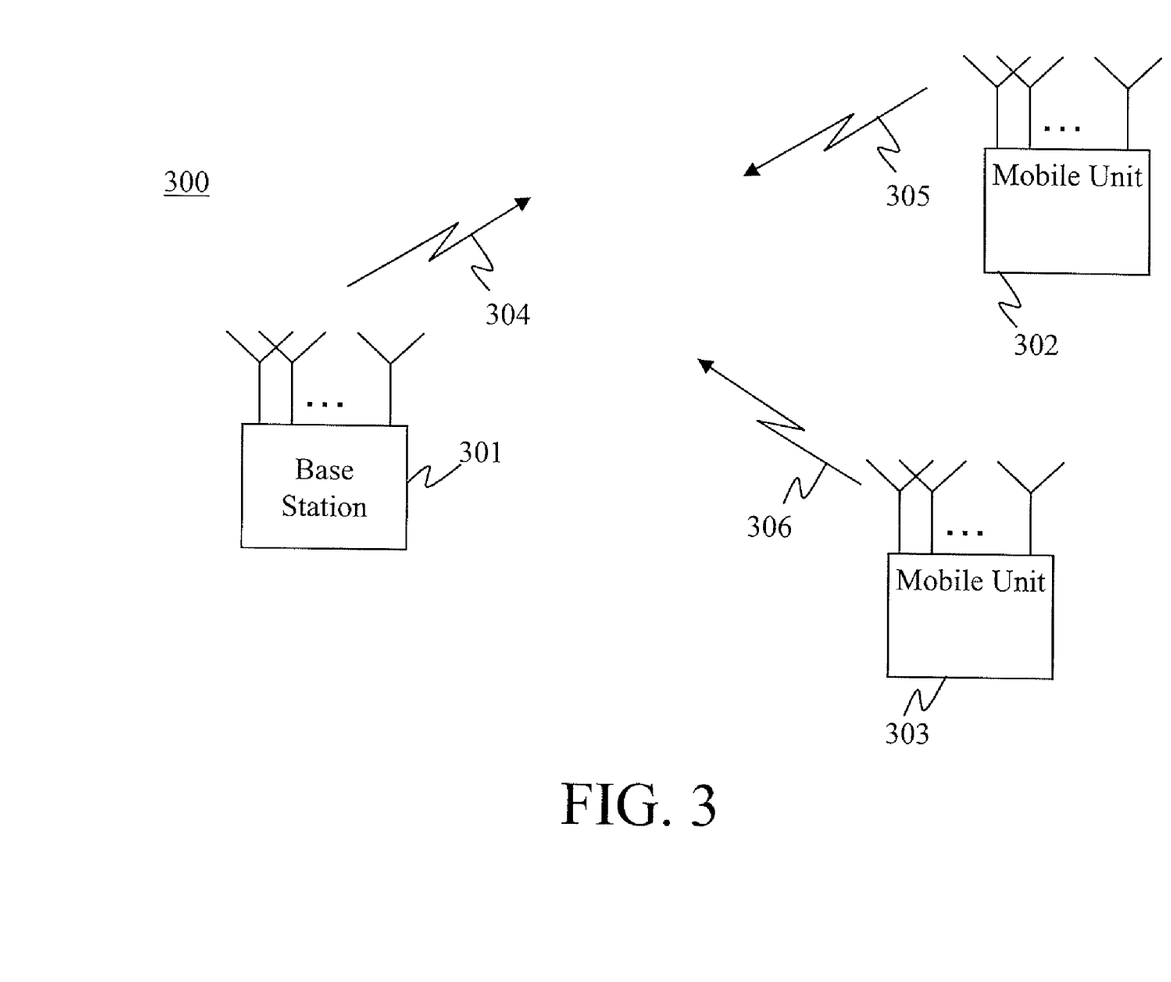
FIG. 3 is a block diagram of a communication system.

Turning now to the drawings, wherein like numerals designate like components, FIG. 3 is a block diagram of communication system 300. In the preferred embodiment of the present invention, communication system 300 utilizes an Orthogonal Frequency Division Multiplexed (OFDM) or multicarrier based architecture. In alternate embodiments of the present invention, this architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques.

As shown, communication system 300 comprises a base station 301 and multiple mobile or stationary nodes 302-303. Although only a single base station and two nodes are shown, one of ordinary skill in the art will recognize that such communication systems generally comprise multiple base stations 301 in communication with many nodes 302-303. During operation, communication system 300 may utilize DOD beamforming to beamform transmissions between base station 301 and nodes 302-303. As discussed above, beamforming is accomplished by employing multiple antennas at the transmit site and weighting each antenna such that the combined transmissions result in a beamformed pattern having a maximum power received at the receivers.

As discussed above, transmit and receive hardware can induce an unknown gain and phase on each transmit and receive branches due to such hardware mismatches such as cable length differences and filter response differences. These unknown gain and phase values, which may be frequency selective, make DOA or DOD estimation difficult (if not impossible) because they change the array response vector from what theory predicts.

In order to address this issue, manifold calibration is performed by base station 301. For DOD beamforming, manifold calibration means that a DOA estimated on the uplink can be translated to a DOD on the downlink (i.e., a beam can be pointed in the mobile direction using an uplink DOA estimate). For DOA estimation on the uplink, manifold calibration means that a signal received from a certain direction on the uplink matches the expected array manifold from theory (or equivalently that the baseband channel matches the RF channel). During operation, an uplink DOA and a downlink DOD calibration procedure is implemented using uplink signals and GPS information from a subset of mobiles without the need of calibration circuitry at the base. Because the presented calibration procedure needs no new hardware it can be deployed in existing deployments with only a software upgrade.

Automatic DOA Calibration Procedure

In order to remove the unwanted effects of the receiver gain and phase values, the following automated DOA calibration procedure may be used. It will be assumed without loss of generality that the calibration coefficients and hence the hardware induced gain and phases are relative constant across frequency so that the dependence on k (frequency) is dropped. (Accounting for the frequency dependency is a straightforward extension.) Hence C=diag(c) where c= $[c_1, \ldots, c_M]^T$, D=diag(d) where d=$[d_1, \ldots, d_M]^T$, G=diag(g) where g=$[g_1, \ldots, g_M]^T$, and Q=diag(q) where q=$[q_1, \ldots, q_M]^T$. First the operation for a single mobile is presented and then this method is extended to multiple mobiles.

Single-Mobile Operation

There are two options for finding C, one is to find it directly from observations of the received signal, the other is to find G and invert it. For either method, the DOA, θ, of the mobile is needed which may be obtained from GPS information or from another location estimation process such as E911 location methods that use time of arrival information concerning the mobile based on observations at multiple base stations.

To find C at time instance b (referred to as $C_b$ or C(b)) using either option, the dominant received vector at time b, r(b), is needed to relate the expected dominant angle of the mobile from GPS to the measured signal received through the hardware chain. The following covariance (correlation) matrix can be used to determine the dominant received vector from the mobile:

$$M \times M \quad R(b) = \sum_{k=0}^{K-1} Y(k,b) Y^H(k,b) \qquad (6)$$

From R(b) the dominant received vector, r(b), is the singular vector associated with the largest singular vector of R(b) (which may also be referred to as the largest singular vector of R(b)). There is some ambiguity as to how a singular vector is calculated so r(b) will likely not match a(θ) even in a perfectly line of sight environment. Hence r(b) should be normalized so that the first element in r(b) matches the first element in a(θ). Mathematically the r(b) used in the following equations should be $r(b)a_1(\theta)/r_1(b)$ where r(b) is the largest singular vector with the arbitrary scaling, $a_1(\theta)$ is the first element of a(θ) (which for the ULA of Error! Reference source not found. is 1), and $r_1(b)$ is the first element of r(b).

The following mathematical relationship can be used to estimate G at time b (referred to as $G_b$ or G(b)) using r(b) and a(θ) (where a(θ) is the array manifold for the DOA of the mobile):

$$G_b a(\theta) = r(b) \qquad (7)$$

This equation can be rearranged into the following equivalent equation which assists in finding a least squares estimate of $G_b$:

$$A g_b = r(b) \qquad (8)$$

where A=diag(a(θ)) and $g_b$ is the M×1 vector containing the gains and phases of the receive hardware (i.e., $G_b$=diag($g_b$)). An estimate of $g_b$ is given as:

$$\hat{g}_b = (A^H A)^{-1} A^H r(b) \qquad (9)$$

Then an estimate of $C_b$ would be the inverse of diag($\hat{g}_b$).

The other option is to estimate $C_b$ directly without finding $G_b$ first which can be done using the following relationship:

$$a(\theta) = C r(b) \qquad (10)$$

This equation can be rearranged into the following equivalent equation which assists in finding a least squares estimate of $C_b$=diag($c_b$):

$$a(\theta) = W c_b \qquad (11)$$

where W=diag(r(b)). An estimate of $c_b$ is then given as:

$$\hat{c}_b = (W^H W)^{-1} W^H a(\theta) \qquad (12)$$

Note that the above procedure can work even if outdated calibration weights are applied to the received signal as is shown in FIG. 2 by simply dividing out the outdated DOA calibration coefficients from the received signal (i.e., the effects of the outdated DOA calibration coefficients are removed from the received signal). Equivalently the outdated calibration weights could also be removed from the dominant vector r(b) by dividing out the outdated DOA coefficients from r(b).

The steps for single mobile operation are as follows:
1. Be provided the DOA of the mobile, θ, from GPS or some other source like E911 and form a(θ) (e.g., using Error! Reference source not found). The important thing to note here is that θ is not determined by analyzing a direction of the incoming signal from the mobile. Instead, θ is determined by some other means.
2. Receive an uplink transmission from the mobile, Y(k,b).

3. Compute the covariance matrix estimate for the mobile at time b, R(b), using the received uplink transmission (e.g., compute R(b) using Error! Reference source not found).
4. Compute the dominant received vector at time b, r(b) as the largest singular vector of R(b).
5. Normalize r(b) by updating it according to $r(b)=r(b)a_1(\theta)/r_1(b)$.
6. For the preferred embodiment, form W=diag(r(b)) and for the alternate embodiment form A=diag(a(θ)).
7. For the preferred embodiment compute $\hat{c}_b=(W^H W)^{-1} W^H a(\theta)$ and $C=\text{diag}(\hat{c}_b)$. For the alternate embodiment compute $\hat{g}_b=(A^H A)^{-1} A^H r(b)$ form $G=\text{diag}(\hat{g}_b)$, and then $C=G^{-1}$.

Multiple Mobile Operation

The DOA calibration procedure using multiple mobiles is written assuming that the calibration coefficients need to be refreshed every t hours. Basically a set of mobiles whose GPS information (x and y location or angle relative to the base, θ) is known for a given uplink transmission and which are mostly line of sight (LOS) (as determined from uplink channel measurements) are used to calibrate the receive array. Since only GPS information and an uplink signal are required, this procedure works for both TDD and FDD systems.

In the following procedure it will be assumed that the time index b is measured in seconds and that Matlab notation (as is known in the art) will be used for matrix manipulation; for example [ ] is an empty matrix. Also it will be assumed that the DOA calibration weights are not a function of frequency. The alteration of the algorithm is easy to account for frequency-selective calibration weights by finding a covariance matrix estimate on a set of frequencies where the calibration coefficients do not change and then calculating the largest singular vector in step 8 for this new covariance matrix estimate. Note that for frequency-selective calibration, the covariance matrix estimate in step 3 should be as broadband as possible (i.e., not on a small set of subcarriers) since it is used to determine if a mobile is LOS or not and also is used to determine a vector that is used to match the expected manifold as determined from the GSP information. For example the uplink signal could be a broadband sounding signal that occupies every $p^{th}$ subcarrier.

The DOA calibration procedure for multiple mobiles is given as follows:
1. Set the number of mobiles in the set of line of sight (LOS) mobiles, $N_{LOS}$, to 0 and set the number of mobiles in the set of non-los mobiles, $N_n$, to 0. Set w=[ ] and W=[ ] (i.e., to an empty vector and matrix respectively).
2. GPS information (x and y location or DOA θ) is obtained for a mobile which is not in the current set of LOS or non-LOS mobiles along with an uplink signal, Y(k,b) (assuming $0 \leq k \leq K-1$) that occurs close to when the GPS information is obtained (e.g., within 1.0 second).
3. Calculate the covariance matrix estimate as $$R(b) = \sum_{k=0}^{K-1} Y(k,b) Y^H(k,b)$$

and determine the largest and second largest singular values of R(b) denoted $s_1$ and $s_2$ respectively. These two singular values are used in Step 4 to determine if the mobile is LOS or not.

4. If $s_1 > \alpha s_2$ (e.g., α=0.1), then go to step 6 (i.e., the mobile is likely in LOS conditions), otherwise go to step 5.
5. Record the mobile in the set of non-LOS mobiles (along with the time of its uplink transmission, b) and increment $N_n = N_n + 1$. Go to step 11.
6. Determine the DOA, θ, of the mobile from the GPS information.
7. Update $N_{LOS} \times 1$ w as $$w = \begin{bmatrix} w \\ a(\theta) \end{bmatrix}.$$

8. Determine the largest singular vector of R(b), r(b).
9. Update $N_{LOS} \times M$ W as $$W = \begin{bmatrix} W \\ \text{diag}(r(b) a_1(\theta) / r_1(b)) \end{bmatrix}$$

where $r_1(b)$ is the first element of r(b) and $a_1(\theta)$ is the first element of a(θ).

10. Record the mobile in the set of LOS mobiles (along with the time of its uplink transmission, b) and increment $N_{LOS} = N_{LOS} + 1$.
11. Remove mobiles in both the set of non-LOS mobiles and LOS mobiles whose uplink information is older than t hours. Decrement the counters, $N_n$ and $N_{LOS}$, according to the number of mobiles removed from each set.
12. Calculate the current DOA calibration coefficients as $$\begin{bmatrix} g_1 \\ \vdots \\ g_M \end{bmatrix} = (W^H W)^{-1} W^H w.$$

13. Go to step 2.

Automatic DOD Calibration Procedure

In this section, an automated DOD calibration procedure is presented. The base station will require a measurement of the downlink channel at a mobile station, which may be obtained through such mobile feedback methods as codebook feedback, covariance matrix feedback, eigenvector feedback, or any other method as is known in the art. Note that in TDD where the base is already reciprocity calibrated, DOA calibration on the uplink will result in DOD calibration on the downlink and hence no further procedure is necessary.

Single Mobile DOD Calibration Procedure

There are two options for finding D, one is to find it directly from the feedback from the mobile, the other is to first find Q and invert it. For either method, the DOA, θ, of the mobile is needed which may be obtained from GPS information or from another location estimation process such as E911 location methods that use time of arrival information concerning the mobile based on observations at multiple base stations. The important thing to note here is that θ is not determined by analyzing or estimating a direction of the incoming signal received from the mobile. Instead, θ is determined by some other means.

To find D at time instance b (referred to as $D_b$ or D(b)) using either option, the dominant received vector at time b, r(b), is needed to relate the expected dominant angle of the mobile from GPS to the measured signal received at the mobile through the transmit hardware chain. Unlike the DOA calibration operation, this r(b) will need be obtained from feedback from the mobile. For example in vector codebook feedback, r(b) is simply equal to the codebook vector selected by the mobile. If the codebook feedback is a matrix, then r(b) is the dominant singular vector of the fed-back matrix. If covariance matrix feedback is used, then r(b) is the dominant singular vector of the fed-back matrix. If eigenvector feedback is used, r(b) equals the fed-back principal eigenvector.

There may some ambiguity as to how r(b) is calculated so r(b) will likely not match $a(\theta)$ even in a perfectly line of sight environment. Hence r(b) should be normalized so that the first element in r(b) matches the first element in $a(\theta)$. Mathematically the r(b) used in the following equations should be r(b) $a_1(\theta)/r_1(b)$ where r(b) obtained from the mobile feedback and may have an arbitrary scaling, $a_1(\theta)$ is the first element of $a(\theta)$ (which for the ULA of Error! Reference source not found. is 1), and $r_1(b)$ is the first element of r(b).

The following mathematical relationship can be used to estimate Q at time b (referred to as $Q_b$ or Q(b)) using r(b) and $a(\theta)$ (where $a(\theta)$ is the array manifold for the DOA of the mobile as determined by GPS in the preferred embodiment):

$$Q_b a(\theta) = r(b) \quad (13)$$

This equation can be rearranged into the following equivalent equation which assists in finding a least squares estimate of $Q_b$:

$$A q_b = r(b) \quad (14)$$

where $A = \text{diag}(a(\theta))$ and $q_b$ is the M×1 vector containing the gains and phases of the transmit hardware (i.e., $Q_b = \text{diag}(q_b)$). An estimate of $q_b$ is given as:

$$q_b = (A^H A)^{-1} A^H r(b) \quad (15)$$

Then an estimate of $D_b$ would be the inverse of $\text{diag}(\hat{q}_b)$. The other option is to estimate $D_b$ directly without finding $Q_b$ first which can be done using the following relationship:

$$a(\theta) = D r(b) \quad (16)$$

This equation can be rearranged into the following equivalent equation which assists in finding a least squares estimate of $D_b = \text{diag}(d_b)$:

$$a(\theta) = W d_b \quad (17)$$

where $W = \text{diag}(r(b))$. An estimate of $d_b$ is then given as:

$$\hat{d}_b = (W^H W)^{-1} W^H a(\theta) \quad (18)$$

Note that the above procedure can work even if outdated DOD calibration weights are applied to the transmitted signal as is shown in FIG. 2 by simply dividing out the outdated DOD calibration coefficients from r(b) (i.e., the effect of the outdated DOD calibration coefficients is removed from the feedback (or dominant downlink vector) r(b)).

The steps for single mobile operation for DOD calibration are as follows:
1. Be provided the DOA of the mobile, $\theta$, from GPS or some other source like E911 and form $a(\theta)$ (e.g., using Error! Reference source not found).
2. Receive feedback from the mobile and determine r(b) from the feedback using a technique described above.
3. Normalize r(b) by updating it according to $r(b) = r(b) a_1(\theta)/r_1(b)$.
4. For the preferred embodiment, form $W = \text{diag}(r(b))$ and for the alternate embodiment form $A = \text{diag}(a(\theta))$.
5. For the preferred embodiment compute $\hat{d}_b = (W^H W)^{-1} W^H a(\theta)$ and $D = \text{diag}(\hat{d}_b)$. For the alternate embodiment compute $\hat{q}_b = (A^H A)^{-1} A^H r(b)$, next form $Q = \text{diag}(\hat{q}_b)$ and then $D = Q^{-1}$.

Multiple Mobile DOD Calibration Procedure

A procedure to DOD calibrate using information from multiple mobiles is now presented. The DOD calibration procedure is very similar to the DOA calibration procedure and even relies on an uplink signal to determine if the mobile is LOS or not. To make the DOD calibration procedure be frequency selective, the feedback in step 8 below just needs to be on a small group of subcarriers.

The DOD calibration procedure for multiple-mobile operation is as follows:
1. Set the number of mobiles in the set of LOS mobiles, $N_{LOS}$, to 0 and set the number of mobiles in the set of non-los mobiles, $N_n$ to 0. Set w=[ ] and W=[ ] (i.e., to an empty vector and matrix respectively).
2. GPS information (x and y location or DOA $\theta$) is obtained for a mobile which is not in the current set of LOS or non-LOS mobiles along with an uplink signal, Y(k,b) (assuming $0 \leq k \leq K-1$) that occurs close to when the GPS information is obtained (e.g., within 1.0 second).
3. Calculate the covariance matrix estimate as $$R(b) = \sum_{k=0}^{K-1} Y(k, b) Y^H(k, b)$$

and determine the largest and second largest singular values of R(b) denoted $s_1$ and $s_2$ respectively which are used to determine if a mobile is in LOS or non-LOS conditions.
4. If $s_1 > \alpha s_2$ (e.g., $\alpha = 0.1$), then go to step 6 (i.e., the mobile is likely in LOS conditions), otherwise go to step 5.
5. Record the mobile in the set of non-LOS mobiles (along with the time of its uplink transmission, b) and increment $N_n = N_n + 1$. Go to step 11.
6. Determine the DOA, $\theta$, of the mobile from the GPS information.
7. Update $N_{LOS}$M×1 w as $$w = \begin{bmatrix} w \\ a(\theta) \end{bmatrix}$$

where $a(\theta)$ is the downlink array manifold vector (as opposed to the uplink array manifold vector used in the DOA calibration procedure).
8. Receive feedback from the mobile and determine the dominant vector from the feedback, u, using one of the procedures described above.
9. Update $N_{LOS}$M×M W as $$W = \begin{bmatrix} W \\ \text{diag}(u a_1(\theta)/u_1) \end{bmatrix}$$

where $u_1$ is the first element of u and $a_1(\theta)$ is the first element of $a(\theta)$.
10. Record the mobile in the set of LOS mobiles (along with the time that the feedback was measured, $b_f$) and increment $N_{LOS} = N_{LOS} + 1$.
11. Remove mobiles in both the set of non-LOS mobiles and LOS mobiles whose uplink information is older than t hours. Decrement the counters, $N_n$ and $N_{LOS}$, according to the number of mobiles removed from each set.

12. Calculate the current DOD calibration coefficients as $$\begin{bmatrix} q_1 \\ \vdots \\ q_M \end{bmatrix} = (W^H W)^{-1} W^H w$$

13. Go to step 2.

Figure 4:
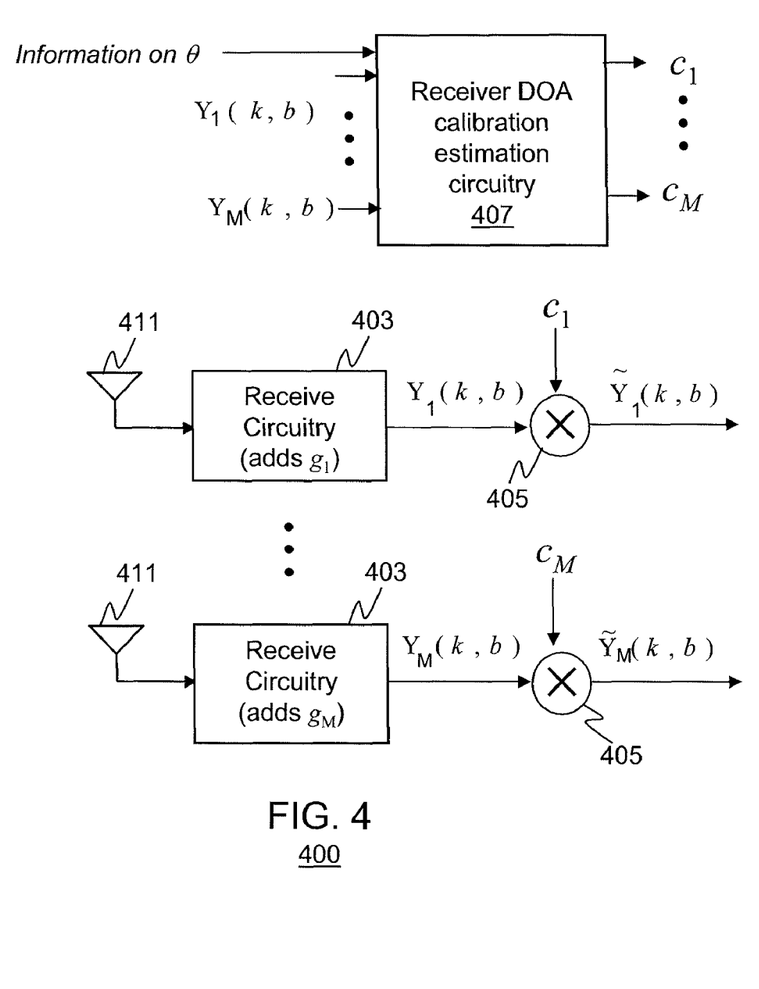
FIG. 4 is a block diagram of a receiver.

FIG. 4 is a block diagram of base station receiver 400 for performing DOA calibration coefficient estimation and correction. As shown, receiver 400 comprises antennas 411, receive circuitry 403, multiplication circuitry 405, and receiver DOA calibration estimation circuitry 407. Receive circuitry 403 is common OFDM circuitry known in the art that outputs $Y_m(k,b)$ on antenna m which is element m of $Y(k,b)$. As discussed, the goal of DOA calibration is to find a matrix $C=\text{diag}(c_1, \ldots, c_M)$ that when it is applied to $Y(k,b)$ it removes the effects of G. Thus, mixer 405 is provided to apply a the DOA calibration coefficient, $c_m$, to $Y_m(k,b)$, outputting $\tilde{Y}_m(k,b)$.

Circuitry 407 comprises a digital signal processor (DSP), general purpose microprocessor, a programmable logic device, or application specific integrated circuit (ASIC) and is utilized to determine C, and output C to multiplication circuitry 405.

Figure 5:
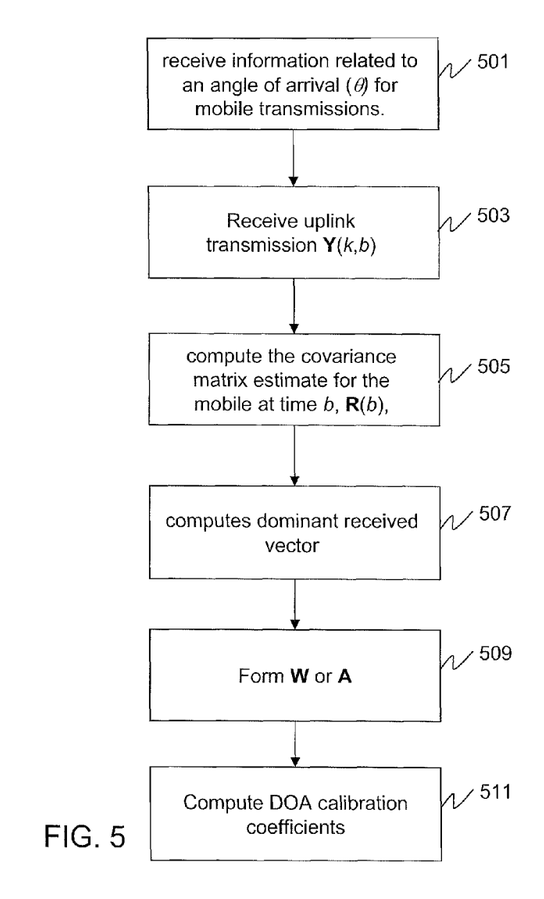
FIG. 5 is a flow chart showing the operation of the receiver of FIG. 4.

FIG. 5 is a flow chart showing operation of receiver 400 during DOA calibration for a single mobile. The logic flow begins at step 501 where circuitry 407 receives information related to an angle of arrival (θ) for mobile transmissions. Angle θ is determined from this information by means other than analyzing the direction of the received signal. As discussed above, the information related to the angle preferably comes from the mobile providing its GPS coordinates to base station 301.

At step 503, an uplink transmission $Y(k,b)$ is received from the mobile unit by receive circuitry 403 and is passed to circuitry 407. Receiver DOA calibration estimation circuitry 407 then computes the covariance matrix estimate for the mobile at time b, $R(b)$, using Error! Reference source not found. (step 505). Circuitry 407 then computes a dominant received vector at time b, $r(b)$ as the largest singular vector of $R(b)$ (step 507) from the uplink transmission. It is assumed that the dominant received vector had no scattering, which would effect the angle of arrival (θ).

At step 509, for the preferred embodiment, $W=\text{diag}(r(b))$ is formed, and for the alternate embodiment $A=\text{diag}(a(\theta))$ is formed. At step 511 circuitry 407 then computes DOA calibration coefficients based on angle of arrival (θ) and $R(b)$. For the preferred embodiment $\hat{c}_b = (W^H W)^{-1} W^H a(\theta)$ and $C=\text{diag}(\hat{c}_b)$. For the alternate embodiment $\hat{g}_b = (A^H A)^{-1} A^H r(b)$, next $G=\text{diag}(\hat{g}_b)$ is formed, and then finally $C=G^{-1}$.

After the stream weights are calculated, they are output to multiplication circuitry 405 where they are applied to the incoming stream (received uplink transmissions) in order to minimize the effects of hardware on the incoming signal and hence DOA. Outdated DOA calibration coefficients can then be removed by circuitry 407 from the dominant vector $r(b)$ after $r(b)$ is calculated.

Figure 6:
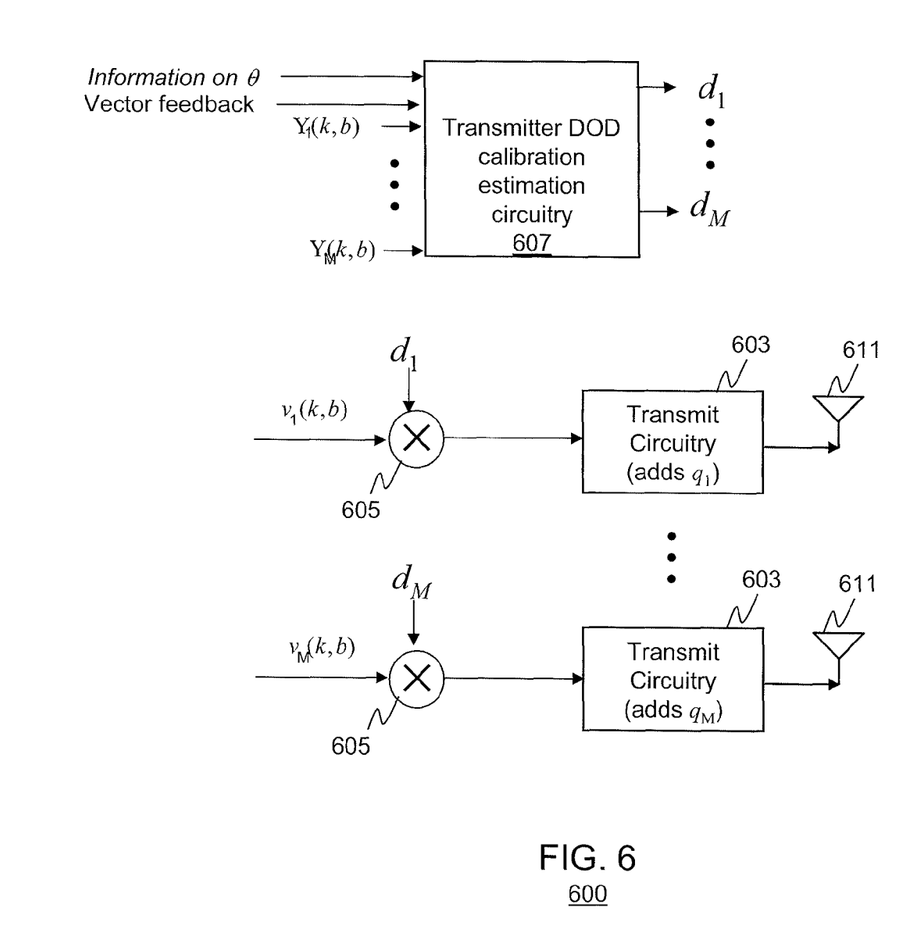
FIG. 6 block diagram of a transmitter.

FIG. 6 is a block diagram of base station transmitter 600 for performing for performing DOD calibration. As shown, transmitter 600 comprises antennas 611, transmit circuitry 603, multiplication circuitry 605, and transmitter DOD calibration estimation circuitry 607. Transmit circuitry 603 is common OFDM circuitry known in the art that outputs $d_m q_m v_m(k,b)$ on antenna branch m. All of the outputs will be weighed and summed by the channel and the result will be a signal, $\tilde{z}(k,b)$, received at the mobile. As discussed, the goal of DOD calibration is to find a matrix D that when it is applied to the signal to be transmitted removes the effects of the gain and phase transmit circuitry $Q=\text{diag}(q_1, \ldots, q_M)$ Circuitry 607 comprises a digital signal processor (DSP), general purpose microprocessor, a programmable logic device, or application specific integrated circuit (ASIC) and is utilized to determine D, and output D to multiplication circuitry 605.

Figure 7:
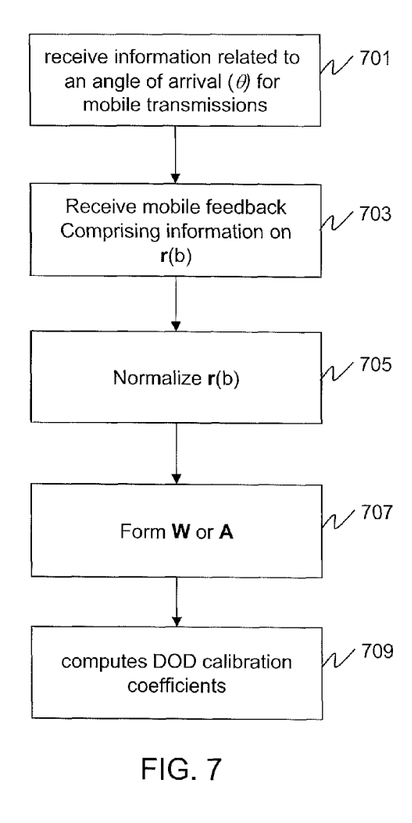
FIG. 7 is a flow chart showing the operation of the transmitter of FIG. 6.

FIG. 7 is a flow chart showing operation of transmitter 600 during DOD calibration for a single mobile. The logic flow begins at step 701 where circuitry 607 receives information related to an angle of arrival (θ) for mobile transmissions. Angle θ is determined from this information by means other than analyzing the direction of the received signal. As discussed above, the information related to the angle preferably comes from the mobile providing its GPS coordinates to base station 301.

At step 703, feedback from the mobile is received by receive circuitry (not shown in FIG. 6). The feedback may, for example, may be vector feedback in the form of codebook feedback, and is passed to circuitry 607. This feedback preferably comprises information on a dominant downlink vector $r(b)$. Transmitter DOD calibration estimation circuitry 607 then normalizes $r(b)$ by updating it according to $r(b) = r(b) a_1(\theta)/r_1(b)$ (step 705).

At step 707, for the preferred embodiment, $W=\text{diag}(r(b))$ is formed, and for the alternate embodiment $A=\text{diag}(a(\theta))$ is formed by circuitry 607. At step 709 circuitry 607 then computes DOD calibration coefficients based on angle of arrival (θ) and $r(b)$. For the preferred embodiment $\hat{d}_b = (W^H W)^{-1} W^H a(\theta)$ and $D=\text{diag}(\hat{d}_b)$. For the alternate embodiment $\hat{q}_b = (A^H A)^{-1} A^H r(b)$, next $Q=\text{diag}(\hat{q}_b)$ is formed, and then finally $D=Q^{-1}$.

After the stream weights are calculated, they are output to multiplication circuitry 605 where they are applied to the outgoing stream (downlink transmissions) in order to minimize the effects of hardware on the outgoing signal.

Figure 8:
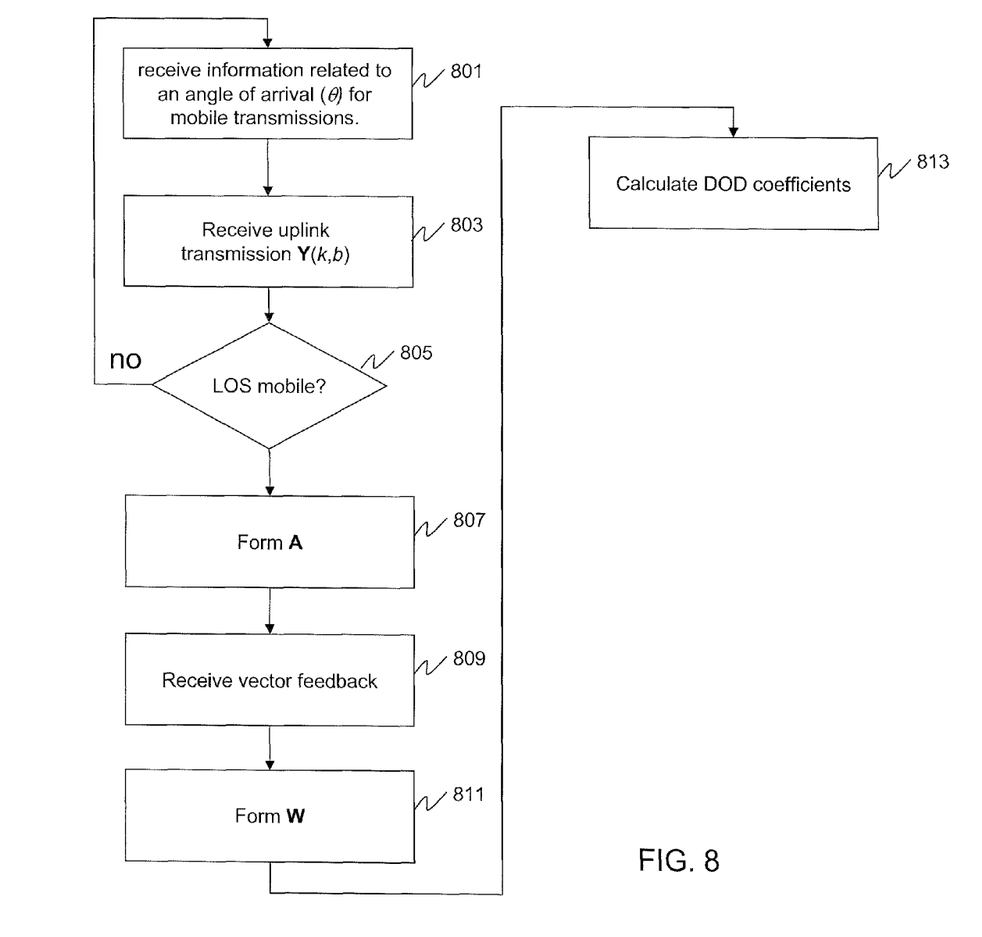
FIG. 8. is a flow chart showing an alternate operation of the transmitter of FIG. 6.

FIG. 8 is a flow chart showing operation of transmitter 600 for DOD calibration using multiple mobiles. The logic flow begins at step 801 where circuitry 607 receives information related to an angle of arrival (θ) for mobile transmissions. Angle θ is determined from this information by means other than analyzing the direction of the received signal. As discussed above, the information related to the angle preferably comes from the mobile providing its GPS coordinates to base station 301.

At step 803, an uplink transmission $Y(k,b)$ is received by receive circuitry 403 and passed to circuitry 607. At step 805, transmitter DOD calibration estimation circuitry 607 then determines if the mobile was a line-of-sight (LOS) mobile (see steps 3-5 above). If the mobile was a non-LOS mobile, the logic flow returns to step 801 and the process continues for another mobile unit. If, however, the mobile unit was a LOS mobile, the logic flow continues to step 807 where A is calculated as:

$$A = \begin{bmatrix} A \\ a(\theta) \end{bmatrix}.$$

At step 809 vector feedback (u) is received from the mobile unit and at step 811 W is updated as:

$$W = \begin{bmatrix} W \\ \text{diag}(u/u_1) \end{bmatrix}.$$

At step 813 the current DOD calibration coefficients are calculated as:

$$\begin{bmatrix} q_1 \\ \vdots \\ q_M \end{bmatrix} = (W^H W)^{-1} W^H A.$$

After the DOD calibration coefficients are calculated, they are output to multiplication circuitry 605 where they are applied to the outgoing stream in order to minimize the effects of hardware on the outgoing signal.

While the invention has been particularly shown and described with reference to a particular embodiment. For example, the preceding calibration methods it was assumed that the effects of mutual coupling between antenna elements are negligible (i.e., $a(\theta)$ matches the theoretical array response vector that corresponds to the array geometry). However if the mutual coupling effects are significant, the above algorithms can be modified by replacing the $a(\theta)$ with $Ua(\theta)$ where U is a coupling matrix which contains the effects of the coupling between the antennas as is known in the art. It will be understood by those skilled in the art that various changes in form and details may be made therein without departing from the spirit and scope of the invention. It is intended that such changes come within the scope of the following claims.

The invention claimed is:

1. A method for performing direction of arrival (DOA) manifold calibration, the method comprising the steps of:
   determining by a base station, an angle $\theta$ to a mobile unit, wherein the determination is made by a technique other than determining a direction of a signal received from the mobile unit;
   receiving by the base station, an uplink transmission (Y(k, b)) from the mobile unit, wherein k is a subcarrier index and b is a time index;
   determining, by the base station, a dominant vector r(b) from the received uplink transmission;
     computing, by the base station, calibration coefficients C(b) based on the angle $\theta$ and r(b) and wherein computing the calibration coefficients comprises the steps of:
     determining W=diag(r(b)); and
     determining $C(b)=\text{diag}(\hat{c}_b)$, where $\hat{c}_b=(W^H W)^{-1} W^H a(\theta)$, where $a(\theta)$
   is an array manifold vector; and
   applying, by the base station, the calibration coefficients to received uplink transmissions.

2. The method of claim 1 wherein the step of determining the angle $\theta$ is accomplished by receiving GPS information from the mobile unit.

3. The method of claim 1 wherein the effect of outdated DOA calibration coefficients is removed from the dominant vector r(b).

4. A method for performing direction of departure (DOD) manifold calibration, the method comprising the steps of:
   determining by a base station, an angle $\theta$ to a mobile unit, wherein the determination is made by a technique other than determining a direction of a signal received from the mobile unit;
   receiving by the base station, feedback from the mobile unit regarding a dominant downlink vector r(b), wherein b is a time index;
   determining, by the base station, calibration coefficients D based on the angle $\theta$ and dominant downlink vector r(b), wherein the step of determining the calibration coefficients D, comprises the steps of:
     determining W=diag(r(b)); and
     determining $D=\text{diag}(\hat{d}_b)$, where $\hat{d}_b=(W^H W)^{-1} W^H a(\theta)$, where $a(\theta)$ is
   an array manifold vector; and
   applying, by the base station, the calibration coefficients to downlink transmissions to the mobile unit.

5. The method of claim 4 wherein the step of determining the angle $\theta$ is accomplished by receiving GPS information from the mobile unit or obtaining time-of-arrival information concerning the mobile unit.

6. The method of claim 4 wherein the effect of outdated calibration coefficients is removed from the dominant downlink vector r(b) before calculating the calibration coefficients.

7. An apparatus for performing direction of arrival (DOA) manifold calibration, the apparatus comprising:
   calibration circuitry having as an input, information on an angle $\theta$ to a mobile unit, an uplink transmission (Y(k,b)) from a mobile unit, wherein k is a subcarrier index and b is a time index, the calibration circuitry determining a dominant vector r(b) from the received uplink transmission, the calibration circuitry outputting calibration coefficients C(b) based on the angle $\theta$ and r(b) and wherein the calibration coefficients C(b) are computed by the calibration circuitry based on the angle $\theta$ and R(b)r(b) by:
   determining W=diag(r(b)); and
   determining $C(b)=\text{diag}(\hat{c}_b)$, where $\hat{c}_b=(W^H W)^{-1} W^H a(\theta)$, where $a(\theta)$ is an array manifold vector; and
   multiplication circuitry applying the calibration coefficients to received uplink transmissions.

8. The apparatus of claim 7 wherein the information on angle $\theta$ comprises GPS information received from the mobile unit.

9. The apparatus of claim 7 wherein the effect of outdated DOA calibration coefficients is removed from the dominant vector r(b).

10. An apparatus for performing direction of departure (DOD) manifold calibration, the apparatus comprising:
    calibration circuitry receiving information on an angle $\theta$ to a mobile unit and receiving vector feedback from the mobile unit regarding a dominant downlink vector r(b), wherein b is a time index, the calibration circuitry outputting calibration coefficients D based on the angle $\theta$ and dominant downlink vector r(b) wherein the calibration coefficients D, are computed by the calibration circuitry by:
    determining W=diag(r(b)); and
    determining $D=\text{diag}(\hat{d}_b)$, where $\hat{d}_b=(W^H W)^{-1} W^H a(\theta)$, where $a(\theta)$ is an
    array manifold vector; and
    multiplication circuitry applying the calibration coefficients to downlink transmissions to the mobile unit.

11. The apparatus of claim 10 wherein the information on the angle $\theta$ comprises GPS information received from the mobile unit.

12. The apparatus of claim 10 wherein the effect of outdated calibration coefficients is removed from the dominant downlink vector r(b) before calculating the calibration coefficients.

* * * * *